United States Patent [19]
Lobjinski et al.

[11] Patent Number: 5,016,245
[45] Date of Patent: May 14, 1991

[54] MODULAR EXPANDABLE DIGITAL SINGLE-STAGE SWITCHING NETWORK IN ATM (ASYNCHRONOUS TRANSFER MODE) TECHNOLOGY FOR A FAST PACKET-SWITCHED TRANSMISSION OF INFORMATION

[75] Inventors: Manfred Lobjinski; Michael Horn; Christian Hinterberger, all of Munich, Fed. Rep. of Germany

[73] Assignee: Siemens Aktiengesellschaft, Munich, Fed. Rep. of Germany

[21] Appl. No.: 442,720

[22] Filed: Nov. 29, 1989

[30] Foreign Application Priority Data

Dec. 23, 1988 [DE] Fed. Rep. of Germany ....... 3843724

[51] Int. Cl.[5] .......................................... H04Q 11/04
[52] U.S. Cl. ..................................... 370/60; 370/94.1
[58] Field of Search ....................... 370/60, 94.1, 65.5, 370/85.6; 340/825.79, 825.93, 825.94

[56] References Cited

U.S. PATENT DOCUMENTS

| | | | |
|---|---|---|---|
| 4,635,250 | 1/1987 | Georgiou | 370/65.5 |
| 4,754,451 | 6/1988 | Eng et al. | 370/60 |
| 4,760,570 | 7/1988 | Acampora et al. | 370/60 |
| 4,868,813 | 9/1989 | Suzuki | 370/60 |

OTHER PUBLICATIONS

"The Knockout Switch: A Simple, Modular Architecture for High-Performance Packet Switching", by Yu-Shuan Yeh et al., IEEE Journal on Selected Areas in Communications, vol. Sac-5, No. 8, Oct. 1987, pp. 1274-1283.

*Primary Examiner*—Douglas W. Olms
*Assistant Examiner*—H. Kizou
*Attorney, Agent, or Firm*—Hill, Van Santen, Steadman & Simpson

[57] ABSTRACT

Modular expandable digital switching network in ATM (Asynchronous Transfer Mode) technology for a fast packet-switched transmission of information. The switching network has a J X J array of pre-switching modules and a 1 X J array of final switching modules. The inputs of the switching network are connected to primary inputs of the pre-switching modules, whose outputs are connected to expansion inputs of pre-switching modules in the same column of the subsequent row. The outputs of the pre-switching modules in the final row with index J are connected to the inputs of the final switching modules in the same column, whose outputs are connected to the outputs of the switching network. Thus, a modular expandable switching network in ATM technology can be realized with minimal wiring requirements.

15 Claims, 3 Drawing Sheets

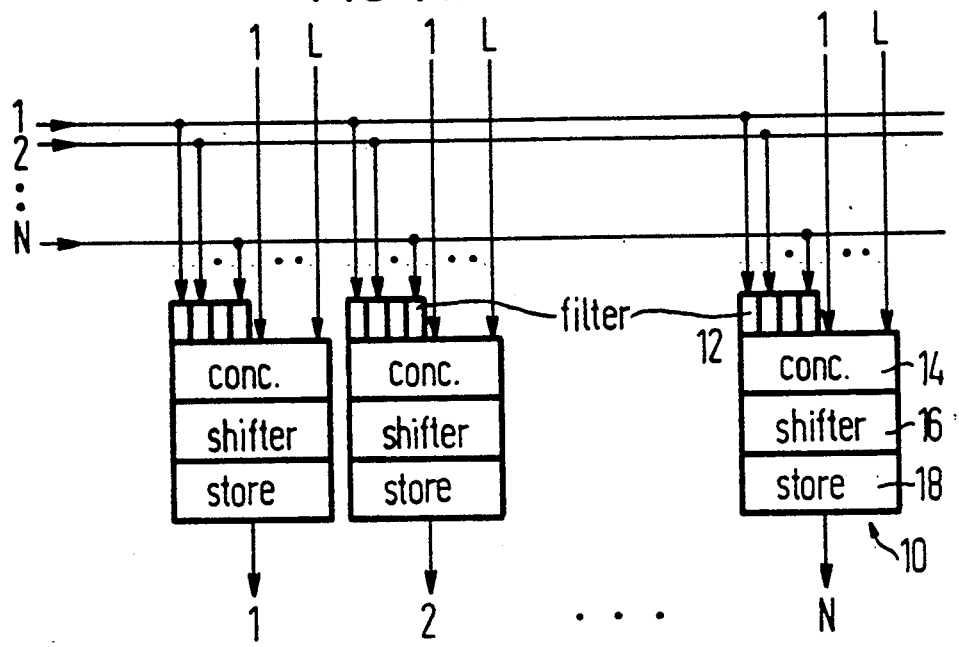
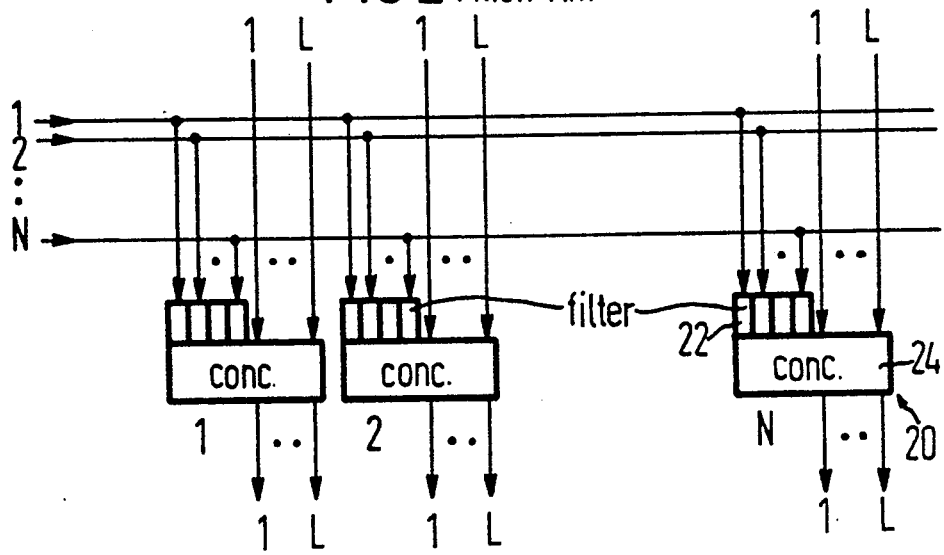

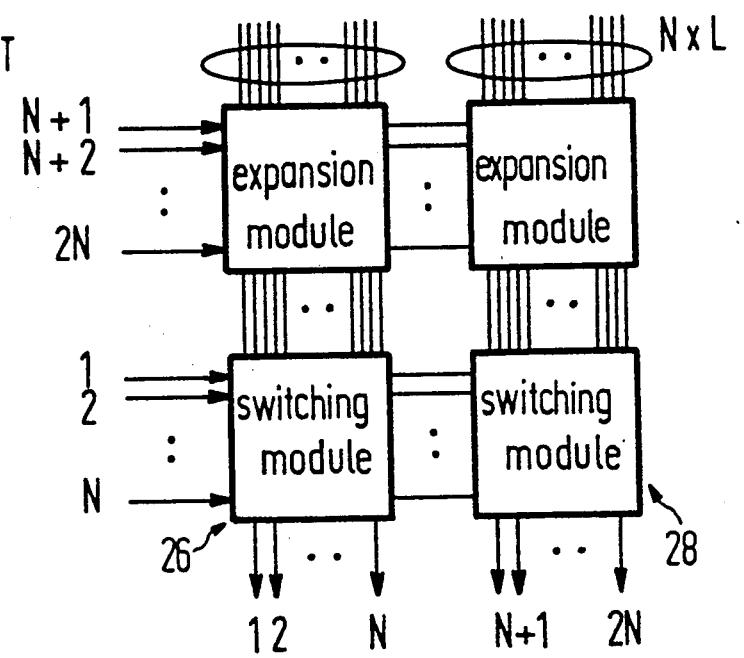
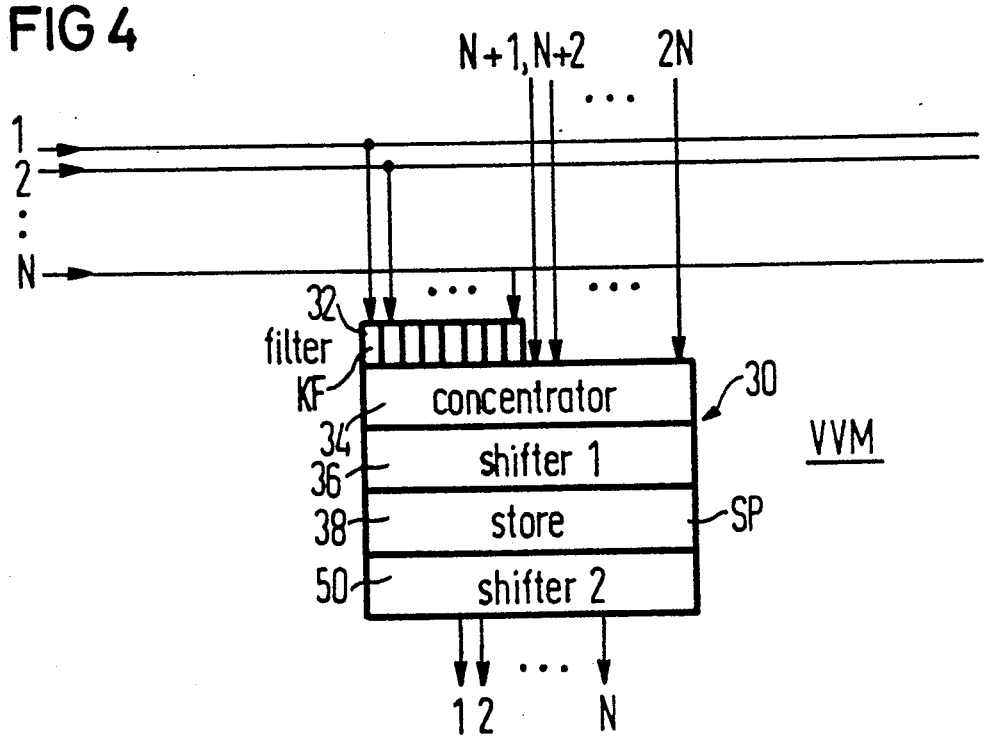

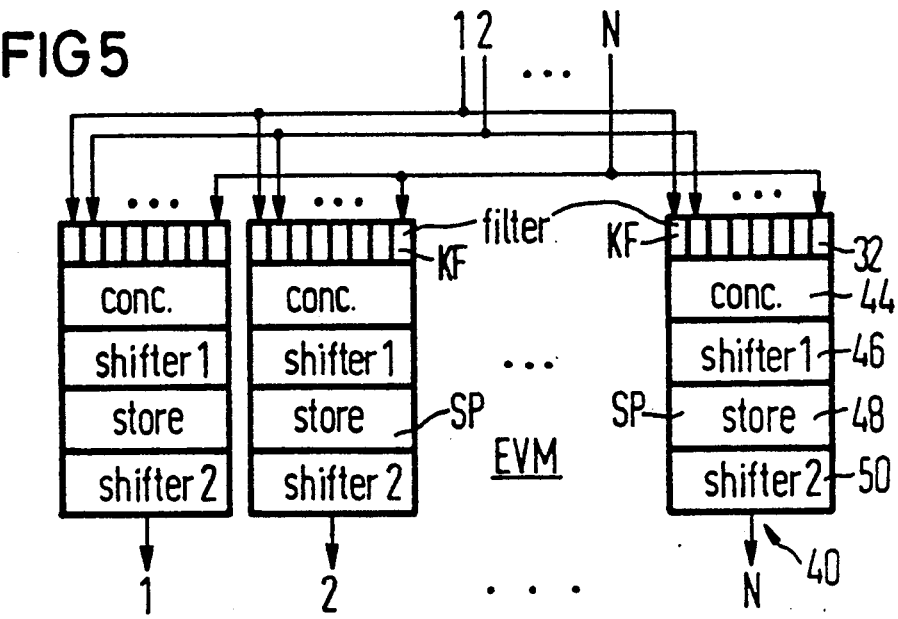
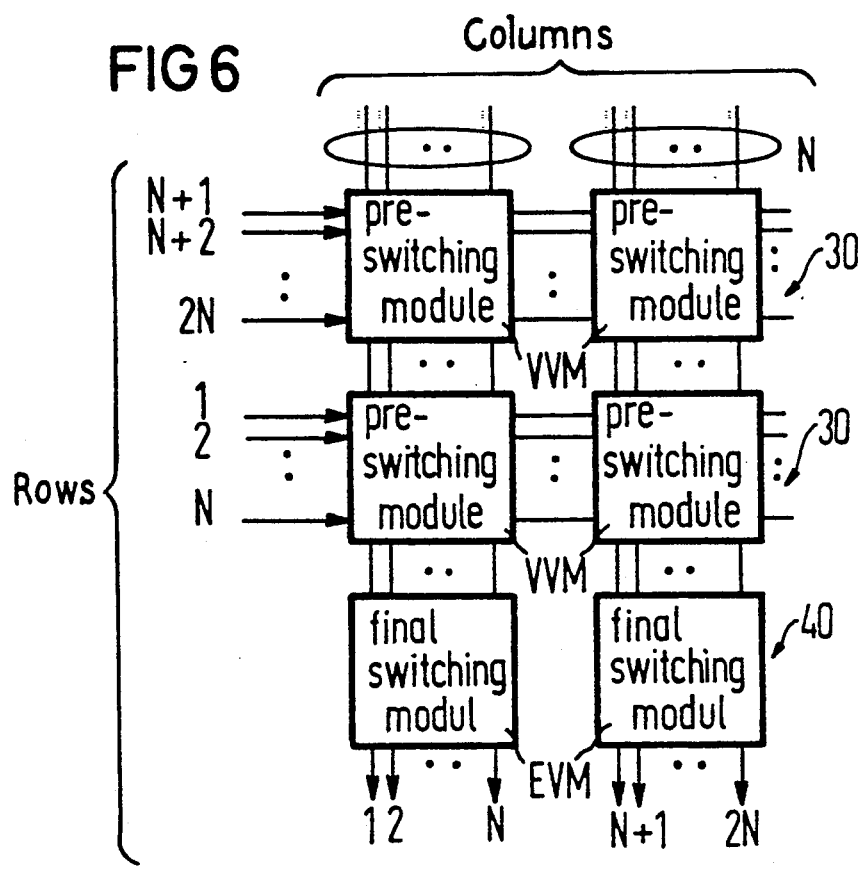

MODULAR EXPANDABLE DIGITAL SINGLE-STAGE SWITCHING NETWORK IN ATM (ASYNCHRONOUS TRANSFER MODE) TECHNOLOGY FOR A FAST PACKET-SWITCHED TRANSMISSION OF INFORMATION

BACKGROUND OF THE INVENTION

The present invention relates to a modular expandable digital single-stage switching network in ATM (Asynchronous Transfer Mode) technology for a fast packet-switched transmission of information. The network has two types of fully switching, switching modules which are provided in each case with a plurality N of first inputs, a plurality N×L of expansion inputs, a plurality N or N×L of first outputs and a plurality N of expansion outputs. The switching modules are arranged in a matrix in such a way that solely basic modules are arranged in the last row of the matrix and in all preceding rows solely expansion modules are arranged. The expansion outputs of the switching modules are connected in each case to the first inputs of the switching modules in the following column, and the first outputs of the expansion modules are connected in each case to the expansion inputs of the switching modules in the following row, the switching modules having in each case on the first input side a header information filter for the purpose of route selection. The basic modules contain in each case a storage function (FIFO=First In/First Out).

A central element of future ATM broadband networks is the switching node. Since the required size of switching nodes can change as a result of traffic growth and new applications, there is a requirement for a simple expandability of switching nodes.

One solution proposed for the modular construction of a switching node ("KO switch") is described in a publication "IEEE Journal on selected areas in communications", Vol. SAC-5, No. 8, October 1987, p. 1274–1283. In the description below, this proposal will be compared with the switching network according to the present invention.

The prior art expansion concept is based on the so-called KO switch as an example of a broadband switching node. An N×N switching module (FIG. 1) consists in this case of N bus interfaces 10 (one for each output) containing in each case a filter 12, concentrator 14, shifter 16 and store 18. N lines are connected. In addition, N×L expansion inputs which lead to the concentrator 14 are provided. In the case of an expansion to 2N inputs and outputs, a further such switching module is additionally required. In addition, two switching modules whose bus interfaces 20 contain only a filter 22 and concentrator 24 (FIG. 2) are required. L intermediate lines are required per output between the (expansion) stages. The size of L depends here on the traffic load present and the required loss probability (e.g. L=8 with 90% traffic load and a packet loss probability of $10^{-6}$, cf. FIG. 5 in the publication cited). The overall number of lines between two switching modules 26, 28 is thus N×L (FIG. 3).

SUMMARY OF THE INVENTION

An object of the present invention is to provide a switching network of the type set forth above which permits an expansion concept with greatly reduced complexity of the components and with an increased number of the lines to be switched, in which only a single type of switching module is necessary.

To achieve this object, a switching network of the present invention is a modular expandable digital single-stage switching network in ATM (Asynchronous Transfer Mode) technology for a fast packet-switched transmission of information, having a pre-switching module, a pre-switching being carried out only with respect to the matrix column, but not with respect to the matrix output, and the number of expansion inputs and the number of first outputs of the pre-switching module being 1/L, namely N, of that of the expansion module. The module contains a single FIFO which can read in 2N packets simultaneously and read out N packets simultaneously and, to avoid so-called packet overtaking, the chronological sequence of packets arriving in each case on one of the n first input lines of a pre-switching module is replaced from case to case by a spatial ordering on the N first output lines of the pre-switching module. A header information filter processes only a part of the header information of the data packets for switching the packets to the respective switching module column. In addition, there are provided for each matrix column a further pre-switching module and a final switching module, which carries out a final switching to the matrix output, the first outputs of said pre-switching modules being connected to the respective inputs of the final switching modules. The final switching modules have no expansion inputs and no expansion outputs. The header information filter of the final switching module processes another part of the header information for the final switching to a matrix output.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings,, in the several Figures in which like reference numerals identify like elements, and in which:

FIG. 1 shows a N×N switching modules according to the prior art;

FIG. 2 shows a N×N expansion module according to the prior art;

FIG. 3 shows a block circuit diagram, representing a prior art expansion concept;

FIG. 4 shows a pre-switching module according to the present invention;

FIG. 5 shows a final switching module according to the present invention; and

FIG. 6 shows a block circuit diagram, representing the expansion concept according to the present invention.

DESCRIPTION OF THE PREFERRED EMBODIMENT

According to the present invention, an ATM switching node is provided which permits a simple expandability by multiples of N, N being the number of input and output lines of a basic element (switching module) that can be integrated on one chip. The node has a logical single-stage design. In contrast to multi-stage arrangements it is thus characterized by the omission of complex internal route-finding. The circuit complexity for realizing the node, however, increases by the power of two with the number of lines connected.

The basic idea of the expansion concept according to the present invention is to divide the switching function into two stages. Accordingly, two different switching modules are required which perform a pre-switching and a final switching. As with the prior art N input lines are connected to the pre-switching module 30 (FIG. 4). Filters 32 at the input of the module select those packets intended for one of the N outputs. Via a concentrator 34 and a shifter 36, the packets reach a store 38 which is shared for all N outputs (shared buffer). In addition, N expansion inputs are provided which are connected to the concentrator 34, which thus has a width of 2N lines. The store 38 is to be read out N-times in parallel. The N outputs of the pre-switching module 30 lead either to the expansion inputs of the next pre-switching or, in the last stage, to the inputs of the final switching module.

The final switching module 40 (FIG. 5) differs from the basic switching module of the concept described in the cited publication in that no input lines are directly connected to it. It has the task of switching the packets which arrive for N outputs to the individual outputs. For this, it is of a similar design to the module of the known concept. The filters 42 evaluate the local address for the output lines 1 to N. The concentrator 44, shifter 46 and store 48 fulfill the same functions as in the prior art concept, but differ with regard to complexity.

The expansion concept of the modified structure is illustrated in FIG. 6. The basic unit consists of a pre-switching and a final switching module. The system can be expanded in stages of i*N where i=2, 3 .... In the case of an expansion from N to 2N, a further basic unit is added to the basic unit and over this in each case one pre-switching module. Owing to the structure, an additional outlay of one module per column is required.

In detail, the present invention encompasses, instead of the fully switching expansion module, a pre-switching module VVM, a pre-switching being carried out only with respect to the matrix column, but not with respect to the matrix output. The number of expansion inputs and the number of first outputs of the pre-switching module is 1/L, namely N, of that of the expansion module, said module containing a single FIFO store SP which can read in 2N packets simultaneously and read out N packets simultaneously. To avoid so-called packet overtaking, the chronological sequence of packets arriving in each case on one of the N first input lines of a pre-switching module is replaced from case to case by a spatial ordering on the N first output lines of the pre-switching module VVM. The header information filter KF processes only a part of the header information for switching the packets to the respective switching module column. Instead of the basic module, there are provided in each case a pre-switching module VVM and a final switching module EVM, which carries out a final switching to the matrix output, the first outputs of the pre-switching modules VVM being connected to the respective inputs of the final switching modules EVM. The final switching modules EVM have no expansion inputs and no expansion outputs. The header information filter KF of the final switching module EVM processes another part of the header information for final switching to a matrix output.

The chronological sequence of packets, which is lost in the case where packets are read out from the store SP of the pre-switching module VVM in a single packet cycle, is replaced by spatial ordering in such a way that the packet read into the store first is output via the first output line having the highest priority, that is that line which is processed in the next respective row of the switching network by the store of the respective switching module as the first of all N expansion input lines, the second packet is output via the first output line with the second-highest priority, and so forth, as a result of which the chronological sequence of the packets is recovered.

According to a first solution, the spatial ordering is created by means of a shifting device following the store in the respective switching module. According to a second solution, the spatial ordering is created by means of a microprocessor. According to a third solution, the spatial order is created by means of a PLA (Programmable Logic Array).

The packets arriving on the input lines with different packet phases are brought into a common packet phase position before being processed in the respective switching module.

The number of lines between the modules is substantially reduced from $N \times L$ to N. For this, a certain number of storage locations must be provided in the pre-switching module, which however are not significant since, in comparison to the final switching module, the pre-switching module is far less complex. The results of the comparison are stated in the table below for N=16, L=10 and the expansion stage having 256 lines. The complexity of the filters is reduced by the factor of 2 in the case of the final switching module and by the factor of 32 in the case of the pre-switching module. The complexity of the concentrator and shifter is reduced by the factor of 2.6 in the case of the final switching module, and by the factor of 5 in the case of the pre-switching module (the component width affects the outlay to the power of two).

|   |   | KO concept | | New concept | |
|---|---|---|---|---|---|
|   |   | Expansion module | Basic module | Pre-switching module | Final module |
| A. | Output lines | 160 $N \times L$ | 16 N | 16 N | 16 N |
| B. | Filter | 2048 bits | 2048 bits | 64 bits | 1024 bits |
| C. | Concentrator width | 26 (N-times) | 26 (N-times) | 32 | 16 (N-times) |
| D. | Shifter width | 0 | 26 (N-times) | 32 | 16 (N-times) |
| E. | Store | 0 | S | <S/N | S |

If the individual modules are constructed in CMOS-VLSI, then the complexity of the individual module plays an important role. Namely, in order to be able to keep the design size of the switching matrix as small as possible, it is necessary to select the number N of the lines to be switched per module as large as possible, that is to integrate highly. The design size is then determined by the complexity of the circuit which can be integrated on one chip. It is possible with the present invention described to effectively reduce the complexity of individual components while maintaining the same functionality and hence increase the number of lines which can be switched per module.

In each case the second shifting devices 50 or "shifters 2" in the modules VVM and EVM can be advantageously designed as multiplexers that activate in each case a selected one of their outputs.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. Modular expandable digital single-stage switching network in ATM (Asynchronous Transfer Mode) technology for a fast packet-switched transmission of information, having $J \times N$ network inputs and $J \times N$ network outputs, comprising:

$J \times J$ array of pre-switching modules, each having N primary inputs, N expansion inputs and N pre-switching outputs;

$1 \times J$ array of final switching modules, each having N final inputs and N final outputs;

the $J \times N$ network inputs forming J subdivisions of N inputs, each N network inputs in each subdivision J being connected respectively to the N primary inputs of each of the J pre-switching modules in each column k where $1 \leq k \leq J$ for each row j where $1 \leq j \leq J$; the N pre-switching outputs of the pre-switching modules in row j and column k being connected respectively to the N expression inputs of the pre-switching modules in row j+1 and column k, where $1 \leq j \leq J-1$ and $1 \leq k \leq J$;

the N pre-switching outputs of the pre-switching module in row J and column k being connected to the N final inputs of the final switching module in column k, where $1 \leq k \leq J$; and the N final outputs of the J final modules forming the $J \times N$ network outputs.

2. The switching network according to claim 1, wherein each of the switching modules has on the primary input side a header information filter for the purpose of route selection and a single store, which can read in 2N packets simultaneously and read out N packets simultaneously, operatively connected to the header information filter, a chronological sequence of packets arriving on one of the N primary inputs of the pre-switching module being replaced on the N pre-switching outputs of the pre-switching module, the header information filter processing only a part of a header of the information for switching the packets to the respective switching module column wherein the chronological sequence of packets, which is lost in the case where packets are read out from the store of the pre-switching module, is replaced in such a way that the packet read into the store first is output via the pre-switching output having a highest priority, that is the pre-switching output which is processed in the next respective row of the switching network by the store of the respective switching module as the first of all N expansion inputs, the second packet via the pre-switching output with the second-highest priority, and so forth, as a result of which the chronological sequence of the packets is recovered.

3. The switching network according to claim 2, wherein the replacing of the chronological sequence of packets is created by means of a shifting device following the store in the respective switching module.

4. The switching network according to claim 2, wherein the replacing of the chronological sequence of packets is created by means of a microprocessor.

5. The switching network according to claim 2, wherein the replacing of the chronological sequence of packets is created by means of a PLA (Programmable Logic Array).

6. The switching network according to claim 1, wherein the packets arriving on the primary inputs with different packet phases are brought into a common packet phase position before being processed in the respective switching module.

7. Modular expandable digital single-stage switching network in ATM (Asynchronous Transfer Mode) technology for a fast packet-switched transmission of information, having $J \times N$ network inputs and $J \times N$ network outputs, comprising:

$J \times J$ array of pre-switching modules, each having N primary inputs, N expansion inputs and N pre-switching outputs;

$1 \times J$ array of final switching modules, each having N final inputs and N final outputs;

the $J \times N$ network inputs forming J subdivisions of N inputs, each N network inputs in each subdivision J being connected respectively to the N primary inputs of each of the J pre-switching modules in each column k where $1 \leq k \leq J$ for each row j where $1 \leq j \leq J$;

the N pre-switching outputs of the pre-switching modules in row j and column k being connected respectively to the N expression inputs of the pre-switching modules in row j+1 and column k, where $1 \leq j \leq J-1$ and $1 \leq k \leq J$;

the N pre-switching outputs of the pre-switching module in row J and column k being connected to the N final inputs of the final switching module in column k, where $1 \leq k \leq J$; and the N final outputs of the J final modules forming the $J \times N$ network outputs, each of the switching modules having in each case on the primary input side a header information filter for the purpose of route selection, each of said pre-switching modules containing a single FIFO store, operatively connected to the filter, which can read in 2N packets simultaneously and read out N packets simultaneously, to avoid packet overtaking, a chronological sequence of packets arriving on one of the N primary inputs of the pre-switching module being replaced on the N pre-switching outputs of the pre-switching module, the header information filter processing only a part of a header of the information for switching the packets to the respective switching module column, and the header information filter of each of the final switching module processing another part of the header of the information for the final switching to a network output; the chronological sequence of packets being replaced in such a way that the packet read into the store first is output via the pre-switching output having a highest priority, that is the pre-switching output which is processed in the next respective row of the switching network by the store of the respective switching module as the first of all N expansion inputs, the second packet via the pre-switching output with the second-highest priority, and so forth, as a result of which the chronological sequence of the packets is recovered.

8. The switching network according to claim 7, wherein the replacing of the chronological sequence of packets is created by means of a shifting device following the store in the respective switching module.

9. The switching network according to claim 7, wherein the replacing of the chronological sequence of packets is created by means of a microprocessor.

10. The switching network according to claim 7, wherein the replacing of the chronological sequence of packets is created by means of a PLA (Programmable Logic Array).

11. The switching network according to claim 7, wherein the packets arriving on the primary inputs with different packet phases are brought into a common packet phase position before being processed in the respective switching module.

12. Modular expandable digital single-stage switching network in ATM (Asynchronous Transfer Mode) technology for a fast packet-switched transmission of information, having $J \times N$ network inputs and $J \times N$ network outputs, comprising:

$J \times J$ array of pre-switching modules, each having N primary inputs, N expansion inputs and N pre-switching outputs;

$1 \times J$ array of final switching modules, each having N final inputs and N final outputs;

the $J \times N$ network inputs forming J subdivisions of N inputs, each N network inputs in each subdivision J being connected respectively to the N primary inputs of each of the J pre-switching modules in each column k where $1 \leq k \leq J$ for each row j where $1 \leq j \leq J$;

the N pre-switching outputs of the pre-switching modules in row j and column k being connected respectively to the N expression inputs of the pre-switching modules in row j+1 and column k, where $1 \leq j \leq J-1$ and $1 \leq k \leq J$;

the N pre-switching outputs of the pre-switching module in row J and column k being connected to the N final inputs of the final switching module in column k, where $1 \leq k \leq J$; and the N final outputs of the J final modules forming the $J \times N$ network outputs, each of the switching modules having in each case on the primary input side a header information filter for the purpose of route selection, each of said pre-switching modules containing a single FIFO store, operatively connected to the filter, which can read in 2N packets simultaneously and read out N packets simultaneously, to avoid packet overtaking, a chronological sequence of packets arriving on one of the N primary inputs of the pre-switching module being replaced on the N pre-switching outputs of the pre-switching module, the header information filter processing only a part of the header information for switching the packets to the respective switching module column, and the header information filter of the final switching module processing another part of a header of the information for the final switching to a network output; the chronological sequence of packets being replaced in such a way that the packet read into the store first is output via the pre-switching output having a highest priority, that is the line which is processed in the next respective row of the switching network by the store of the respective switching module as the first of all N expansion inputs, the second packet via the pre-switching output with the second-highest priority, and so forth, as a result of which the chronological sequence of the packets is recovered; and the packets arriving on the primary inputs with different packet phases being brought into a common packet phase position before being processed in the respective switching module.

13. The switching network according to claim 12, wherein the replacing of the chronological sequence of packets is created by means of a shifting device following the store in the respective switching module.

14. The switching network according to claim 12, wherein the replacing of the chronological sequence of packets is created by means of a microprocessor.

15. The switching network according to claim 12, wherein the replacing of the chronological sequence of packets is created by means of a PLA (Programmable Logic Array).

* * * * *